8 Sheets—Sheet 1.

L. MILLER.

GRAIN BINDING HARVESTER.

No. 11,065. Reissued Mar. 4, 1890.

WITNESSES
F. L. Ourand
Rich. M. Smith

INVENTOR
Lewis Miller
by Hill Smith
Attorney.

N. PETERS, Photo-Lithographer, Washington, D. C.

8 Sheets—Sheet 2.

L. MILLER.

GRAIN BINDING HARVESTER.

No. 11,065. Reissued Mar. 4, 1890.

WITNESSES

Franck L. Ourand

Rex. M. Smith.

INVENTOR

Lewis Miller by Will Smith

Attorney

N. PETERS, Photo-Lithographer, Washington, D. C.

8 Sheets—Sheet 3.

L. MILLER.

GRAIN BINDING HARVESTER.

No. 11,065. Reissued Mar. 4, 1890.

WITNESSES
Francis L. Dunwoody
Rev. M. Smith

INVENTOR
Lewis Miller
by A. H. Smith
Attorney

N. PETERS, Photo-Lithographer, Washington, D. C.

L. MILLER.

GRAIN BINDING HARVESTER.

No. 11,065. Reissued Mar. 4, 1890.

WITNESSES
Franck L. Ourand
Rex. M. Smith.

INVENTOR
Lewis Miller
by A. L. Smith
Attorney

N. PETERS, Photo-Lithographer, Washington, D. C.

L. MILLER.

GRAIN BINDING HARVESTER.

No. 11,065. Reissued Mar. 4, 1890.

WITNESSES

F. L. Ourand

Ref. W. Smith

INVENTOR

Lewis Miller by A. H. Smith

Attorney

N. PETERS, Photo-Lithographer, Washington, D. C.

L. MILLER.

GRAIN BINDING HARVESTER.

No. 11,065. Reissued Mar. 4, 1890.

WITNESSES
Franck L. Ourayde
Rex. M. Smith

INVENTOR
Lewis Miller
by A. L. Smith
Attorney

N. PETERS, Photo-Lithographer, Washington, D. C.

L. MILLER.

GRAIN BINDING HARVESTER.

No. 11,065. Reissued Mar. 4, 1890.

WITNESSES
F. C. Durand
Rev. M. Smith

INVENTOR
Lewis Miller
by A. L. Smith
Attorney

N. PETERS, Photo-Lithographer, Washington, D. C.

L. MILLER.
GRAIN BINDING HARVESTER.
No. 11,065. Reissued Mar. 4, 1890.
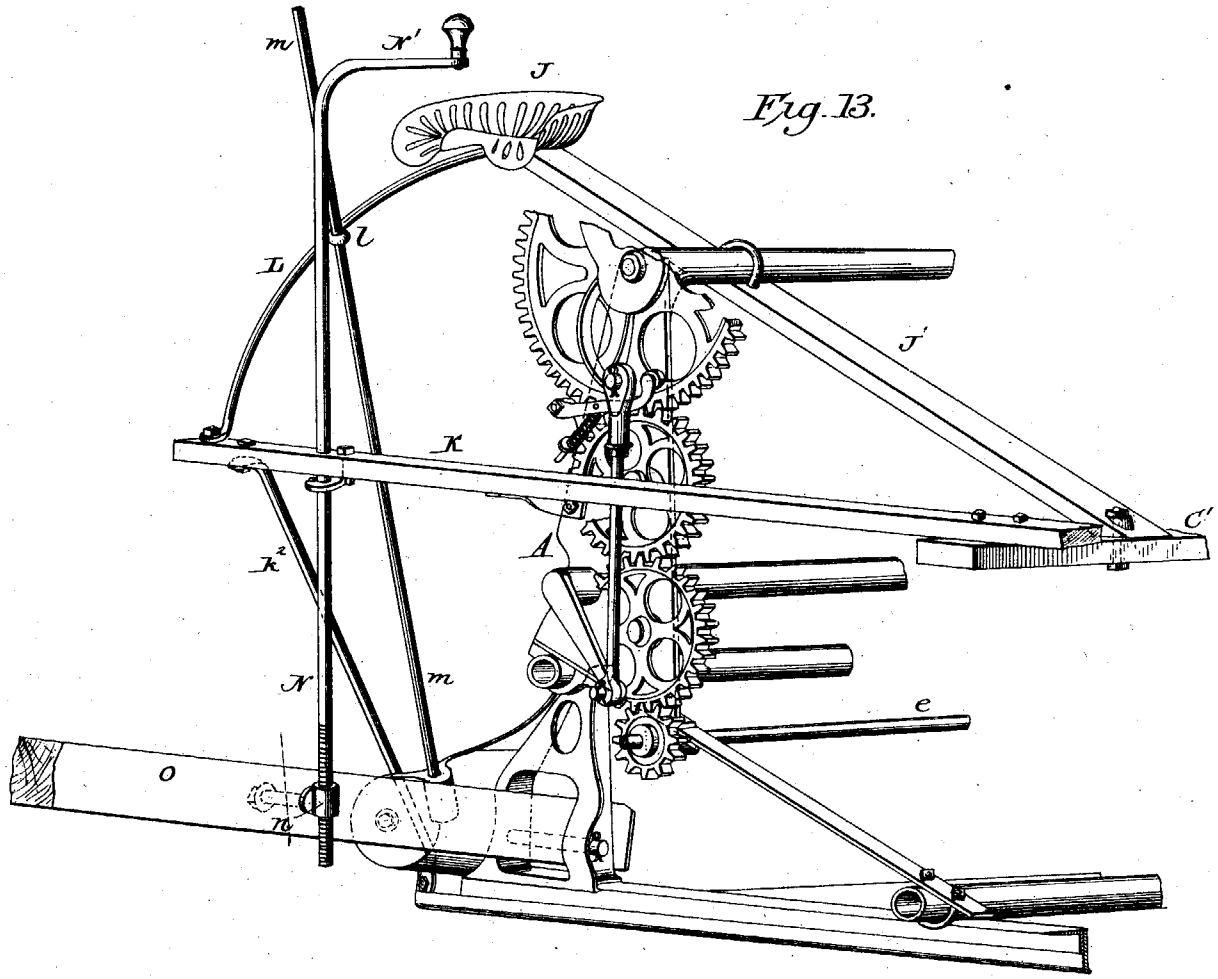
Witnesses
Sidney F. Mellingsworth
Inventor
LEWIS MILLER
By his Attorneys
Baldwin Wooldridge & Wright
N. PETERS, Photo-Lithographer, Washington, D. C.

UNITED STATES PATENT OFFICE.

LEWIS MILLER, OF AKRON, OHIO.

GRAIN-BINDING HARVESTER.

SPECIFICATION forming part of Reissued Letters Patent No. 11,065, dated March 4, 1890.

Original No. 276,448, dated April 24, 1883. Application for reissue filed April 21, 1884. Serial No. 128,760.

*To all whom it may concern:*

Be it known that I, LEWIS MILLER, a citizen of the United States, and a resident of Akron, in the county of Summit and State of Ohio, have invented certain new and useful Improvements in Grain-Binding Harvesters, of which the following is a full, clear, and exact description, reference being had to the accompanying drawings, making part of this specification, in which—

Figure 1:
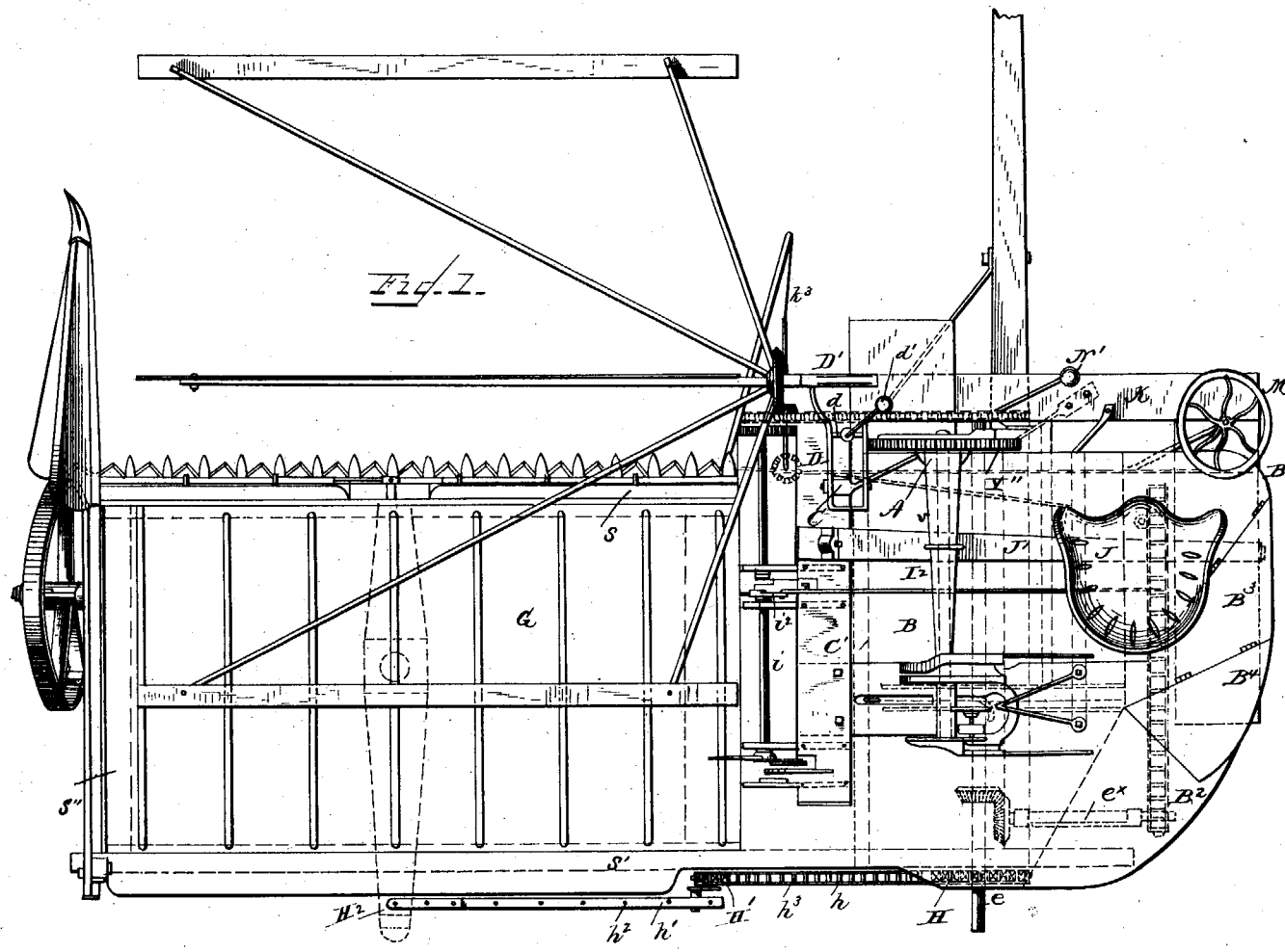
Figure 2:
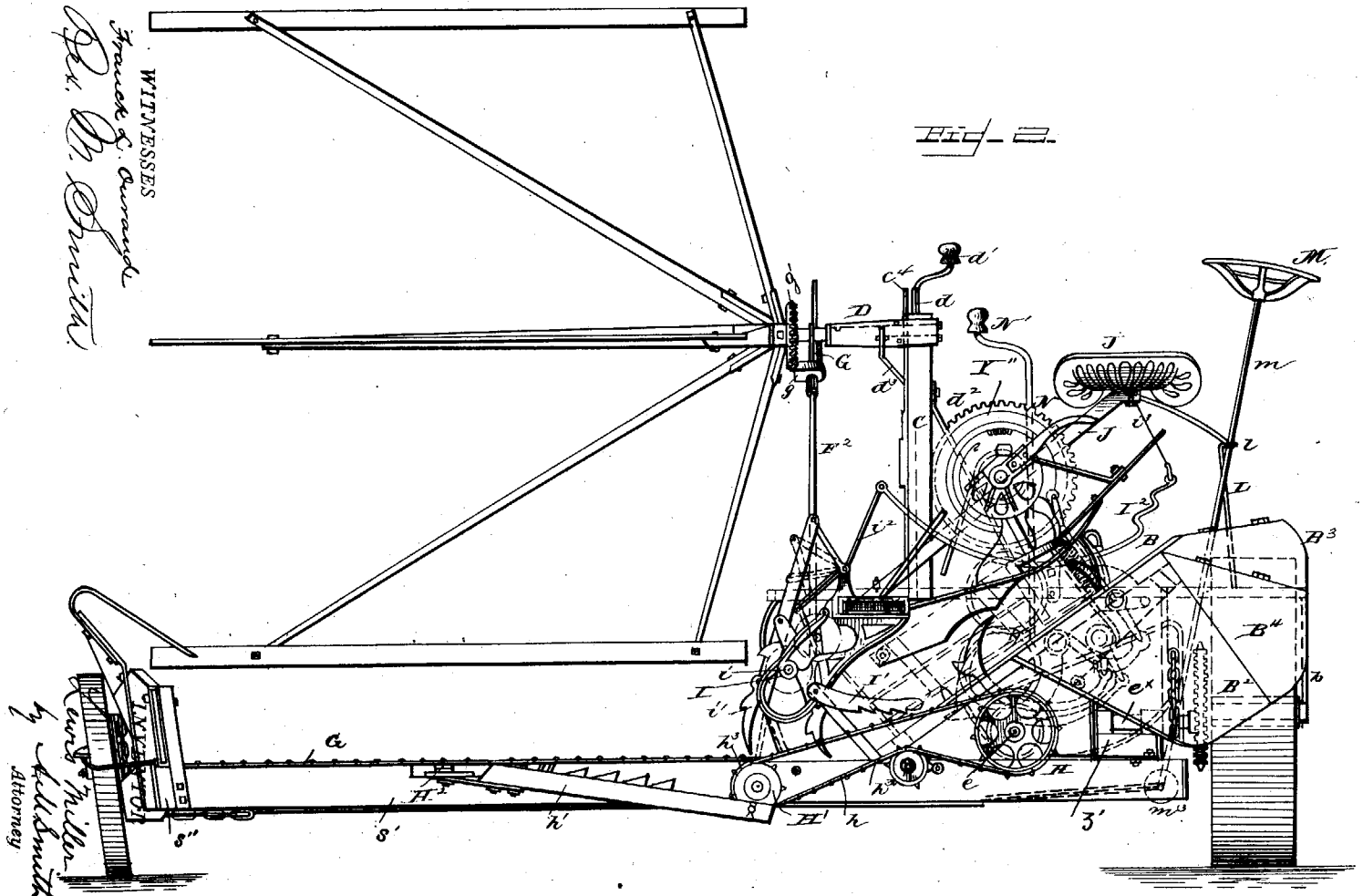
Figure 6:
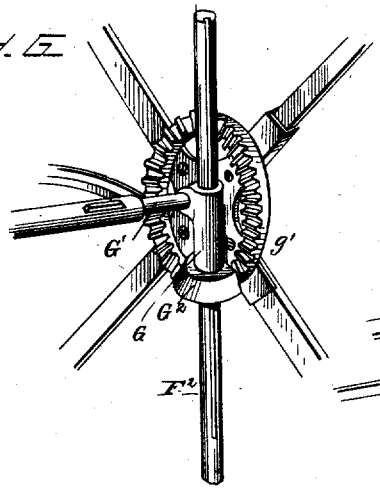
Figure 8:
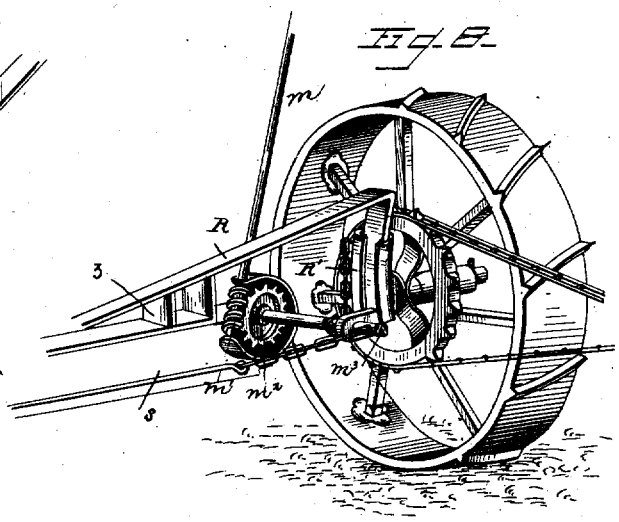
Figure 7:
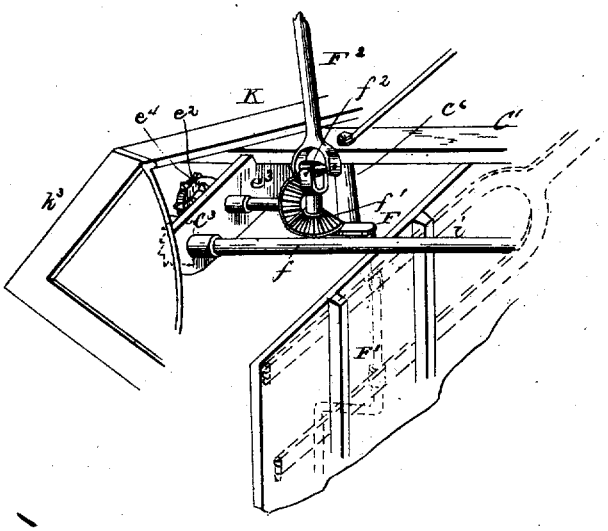
Figure 9:
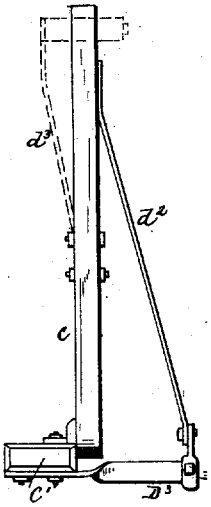
Figure 10:
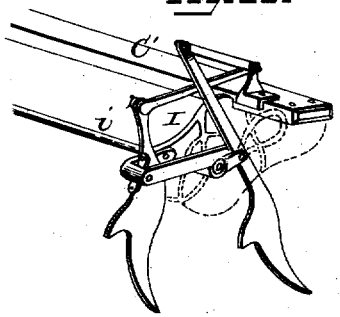
Figure 11:
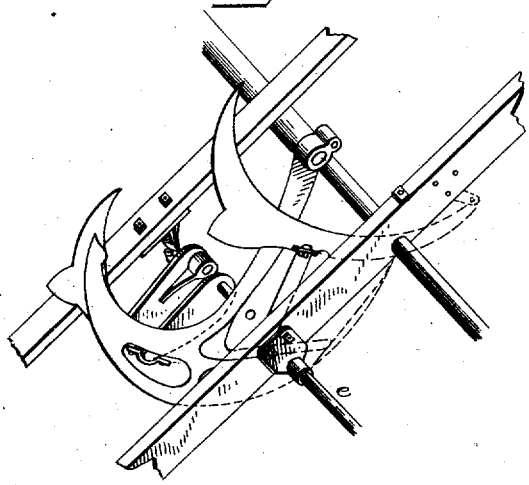
Figure 12:
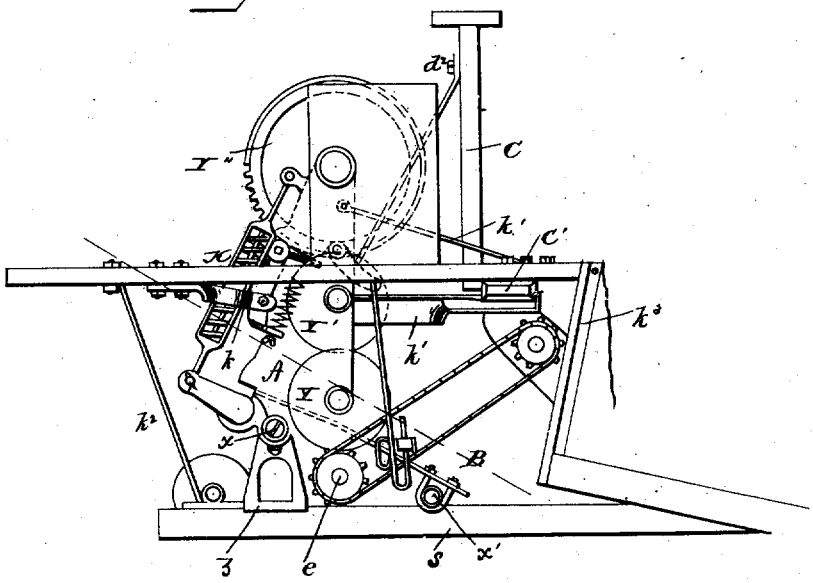

Figure 1 represents a plan or top view of a grain-binding harvester embracing my improvements; Fig. 2, a rear elevation, and Fig. 3 a front elevation, thereof; Fig. 4, a view, in elevation, of the machine as seen from its stubble side; and Fig. 5, a similar view of its grain side. Figs. 6 and 7 represent detail perspective views of the reel-driving devices; Fig. 8, a similar view of the apparatus for raising and lowering the frame on the driving-wheel. Fig. 9 shows the way of bracing the reel-post. Fig. 10 shows the pickers in perspective. Fig. 11 shows a similar view of the binder-arm and pickers; and Fig. 12, a front elevation of the frame, binder-gearing, and adjacent parts. Fig. 13 shows a view in perspective, as seen from the front and divider side of the machine, of portions of the frame, tongue, adjusting devices, driver's seat, and binder mechanism, showing clearly the organization of these parts.

My present invention relates to certain novel combinations and organizations of instrumentalities specifically designated in the claims at the close of this specification.

The machine in its organization resembles that described in Letters Patent No. 276,449, granted to me April 24, 1883, and No. 290,459, granted to me December 18, 1883, and will not, therefore, be described in detail herein, except so far as is necessary to an understanding of the improvements herein claimed. Thus the construction of the main or binder and platform frames, the relation of said parts and of the inclined binder-table to the driving-wheel, and of the binding devices proper to said table, also the construction of the binder-gear standard or yoke *per se*, the construction of the main driving and grain wheels, and the manner of connecting said wheels with the frame of the machine, are features all fully set forth in the above-mentioned patents, and, except in particular features of arrangement hereinafter described, said parts are not herein claimed.

The binder-gear standard A, instead of being arranged in the rear of the path of the grain in its passage from the inner end of the grain-platform over the driving-wheel, as described in the above-mentioned patent, No. 290,459, is arranged in advance of said path, with its tubular arms projecting from its rear face, said standard being secured to the forward transverse bar of the inclined binder-frame, this arrangement permitting a material reduction of the width of the grain-platform and the binder-table as compared with a machine in which the standard is arranged in the rear of the path of the grain and in which arrangement said standard must be set far enough back to accommodate the length of the longest straw, whereas in the present arrangement the grain-platform and the binding-table being made of a width from front to rear sufficient to adapt it to the ordinary length of grain, where the machine is operating upon very tall grain or long straw the heads may overhang the platform and binder-table, there being no obstructing support in its pathway. This arrangement of the binder-standard in connection with the arrangement of the binding devices whereby the grain is bound during its passage and in the process of elevating it over the wheel, enables me to contract the machine within materially reduced limits as compared with the ordinary arrangement of these parts.

The inclined binder-table, upon which the grain is bound between the inner end of the grain-platform and the driving-wheel, is provided at its upper end with a discharging apron or board, forming a rigid lateral extension B′ at the forward part of the said end. This lateral extension overhangs the driving-wheel, and is contracted in width to its rear end, giving it a triangular form, its outer face or edge crossing the vertical plane of the driving-wheel obliquely, as shown. The rear portion of the upper end of the table B is cut away or deflected on a line forming an extension of the outer edge of the part B′, or thereabout, to receive or form a rigid lateral extension $B^2$, said extension $B^2$ overhanging the rear portion of the driving-wheel and the path of the same, and being inclined downward for facilitating the discharge of the bundle.

To the outer end of the extension B′ is hinged a triangular-shaped plate or flap $B^3$, and to the rear end of this flap is hinged a second flap $B^4$, the rear end of the latter lapping over and resting upon the forward end of the inclined extension $B^2$. The outer ends or edges of the hinged portions $B^3$ $B^4$ project slightly beyond the outer face of the driving-wheel, and the flap or part $B^3$ is connected by a standard *b* with the outer end of the drive-wheel axle, which serves to uphold it at a uniform height above the drive-wheel. By this arrangement the portion of the extension overhanging the wheel at its highest point will be held clear of the wheel under any and all adjustments of the height of the main frame and cutting apparatus, and the discharging end of the hinged flaps or apron will always be held at the same height above the ground, the angle of relation thereof to the inclined elevating and binding table varying to accommodate the adjustment in height of the latter. The connection between the standard *b* and the hinged discharging-apron may be such as to adapt the latter to be adjusted in height, if desired, or the standard itself may be made in two parts, one adjustable upon the other, for the same purpose.

The reel-post C is connected by a transverse pivot at its lower end with the longitudinal supporting-bar *c′* to permit the forward and backward adjustment of its upper end and of the reel connected therewith.

Figure 5:
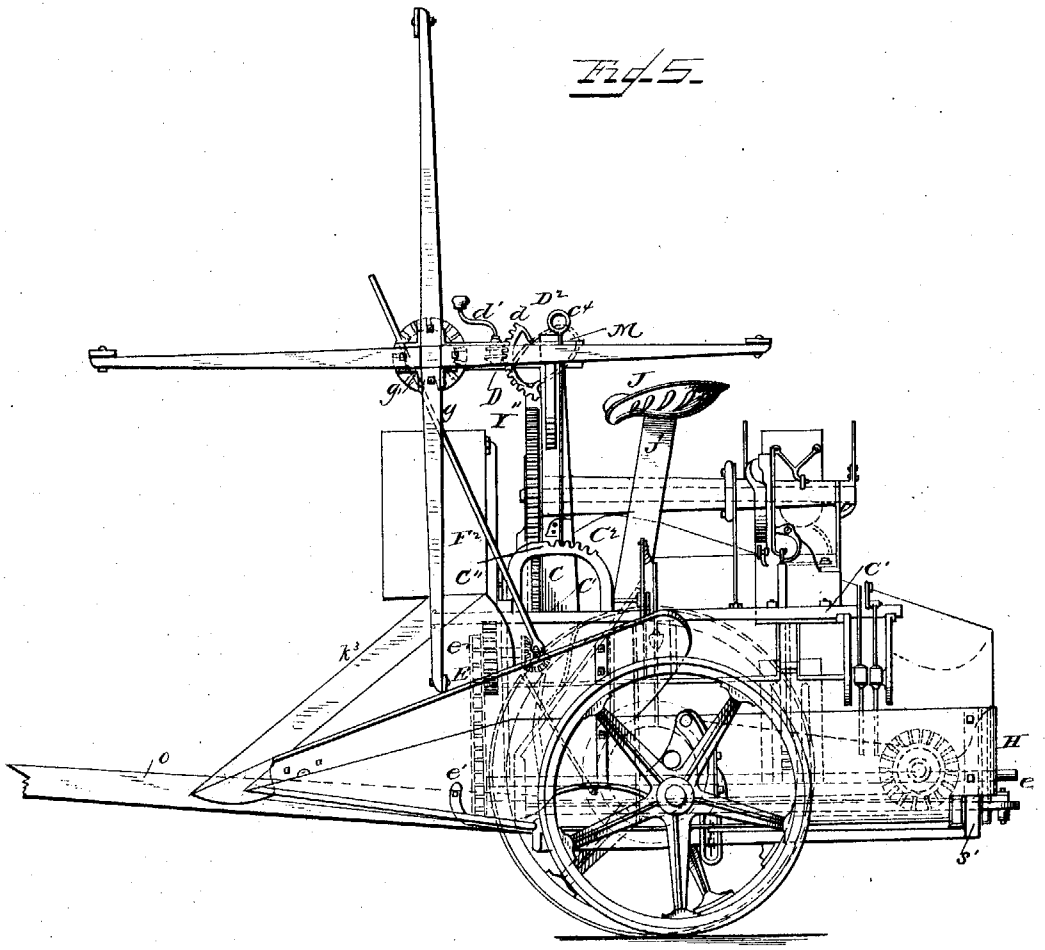

Upon the longitudinal supporting-bar or plank C′ is secured a curved rack $C^2$, Fig. 5, and a weighted or spring-latch moving in suitable ways on the reel-post is provided with a handle $c^4$, within convenient reach of the driver in his seat on the machine, for enabling him to release the latch and adjust the reel-post and reel backward and forward as desired.

Figure 3:
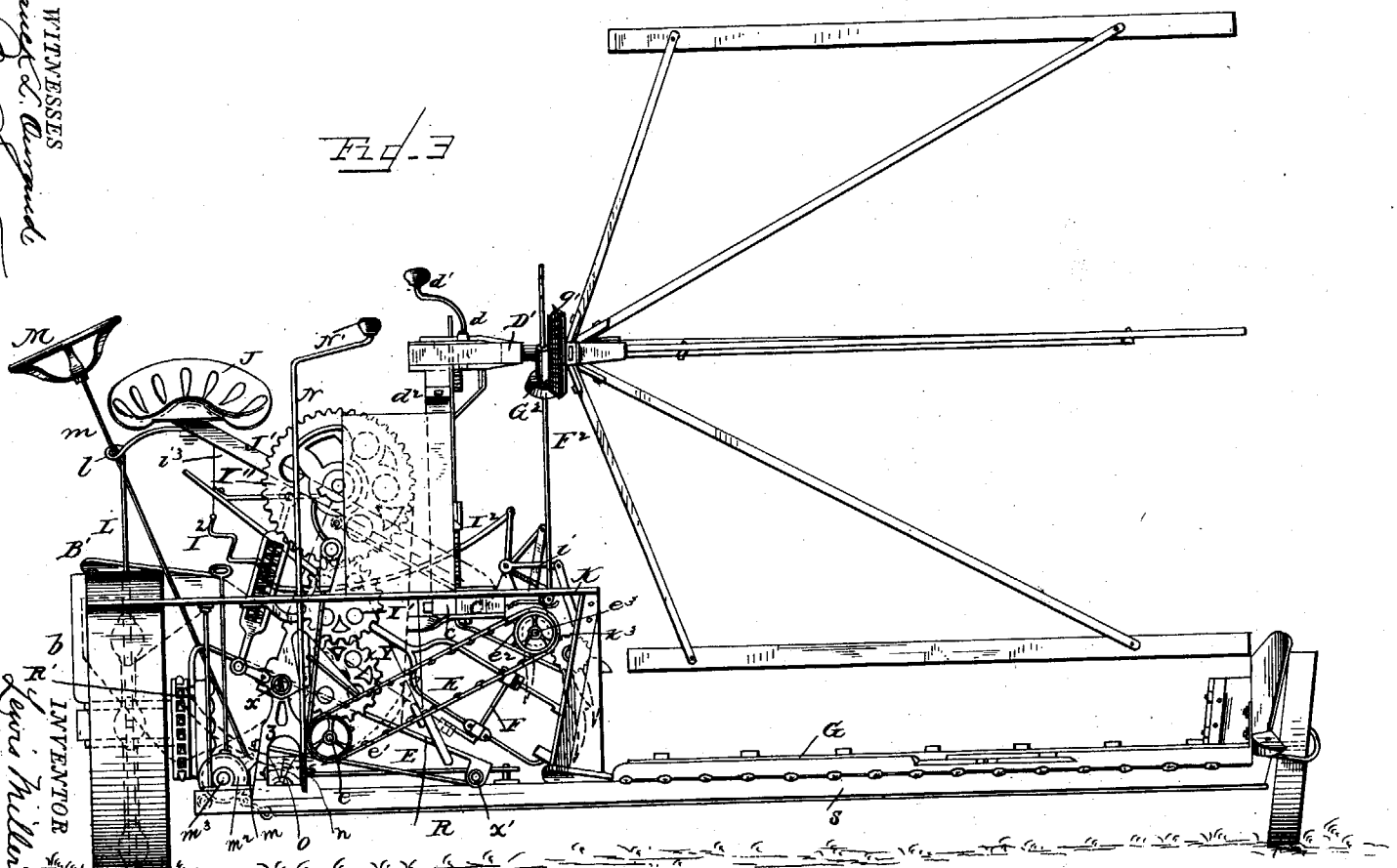
Figure 4:
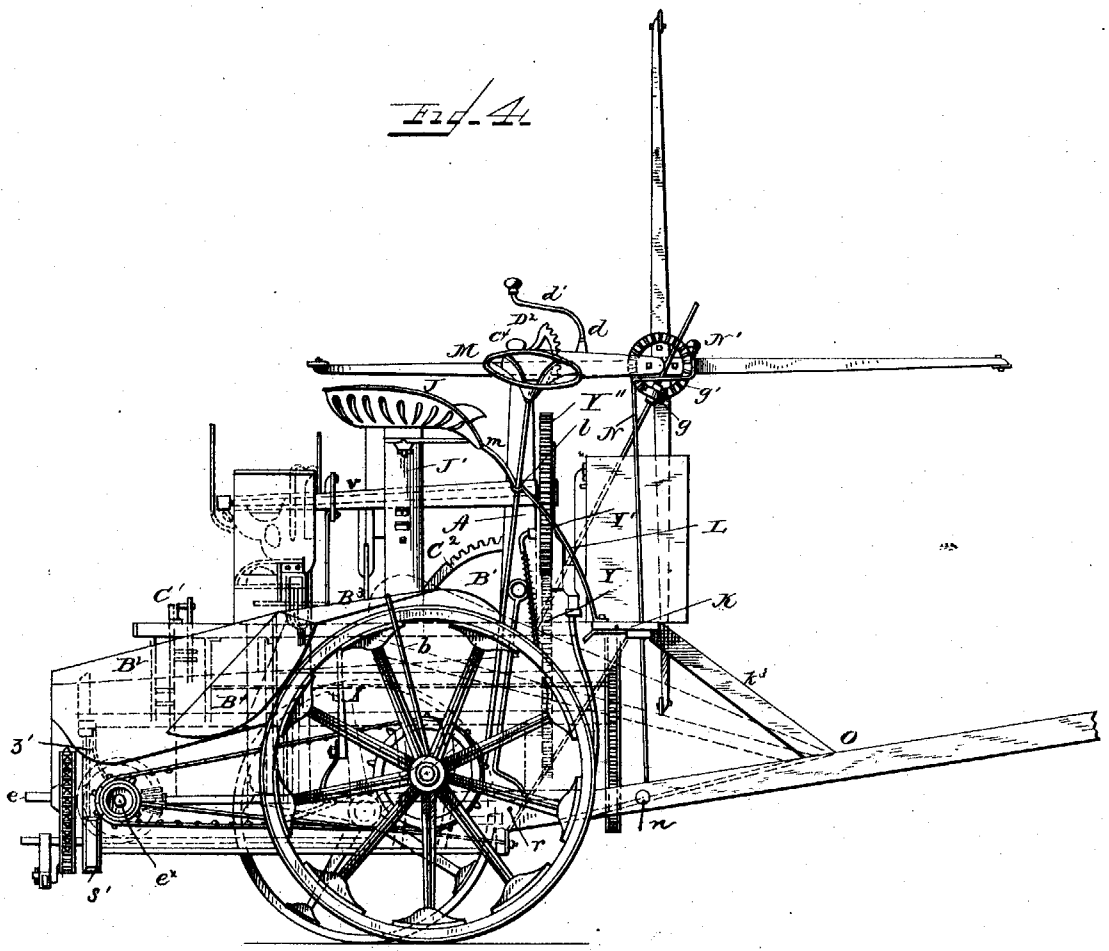

To the upper end of the reel-post the rear end of a yoke or open loop-shaped bracket D, Fig. 1, is pivoted, said yoke being provided on its forward end with a sleeve D′, Fig. 3, in which the reel-shaft has its bearing.

Within the bracket D to the upper end of the reel-post is rigidly secured a forwardly-projecting quadrant-plate $D^2$, Fig. 5, toothed on its forward curved end, and in a cross-bar of the bracket D is mounted a short vertical shaft *d*, provided with a worm which engages with said quadrant-rack. The shaft *d* has a crank-arm *d′* on its upper end within convenient reach of the driver, who by rotating the crank-arm can adjust the forward swinging end of the bracket D for raising or lowering the reel as desired.

The reel is of the type denominated an "overhung" reel, being supported at its inner end only, and for stiffening its support and preventing its sagging lateral braces $d^2$ $d^3$ are employed, the former (see Fig. 9) being pivoted at its lower end to a laterally-projecting arm or bracket $D^3$, secured to the longitudinal supporting-bar C′, and at its upper end bolted rigidly to the post C. The pivoted connection of the brace $d^2$ with the bracket $D^3$ is in line with the pivotal connection of the post C with the bar C′, and the brace thus arranged serves to prevent lateral swaying of the reel-post without interfering with its adjustment as described. A similar brace (indicated at $d^3$ in dotted lines, Fig. 9) may extend from the post C up to one end of the pivot connecting the yoke or loop-bracket D with the post C, and said bracket can thus be given the required width of support necessary to prevent the sagging of the reel-shaft.

The arrangement of gearing for actuating the binding mechanism is the same as that described in Patent No. 290,459, above referred to, except that the binder-gear standard being turned around and placed in front instead of in rear of the path of the grain the gearing is correspondingly transposed.

The main binder-gear shaft *e* is provided on its forward end, in advance of the spur-gear actuating the binding mechanism, with a sprocket-wheel *e′*, from which motion is communicated through an endless chain E to a similar sprocket-wheel $e^2$ on the forward end of a short shaft $e^3$, mounted in a bracket or brackets $C^3$, secured to the bar C′. (See Figs. 3, 7, and 12.)

Upon the rear end of the shaft $e^3$ is secured a bevel-wheel *f*, which engages with and drives a similar wheel *f′*, secured to the upper end of the crank-shaft F, which actuates the butting-board F′, in a manner similar to that shown in Patent No. 290,459, above referred to. This crank-shaft F is arranged at right angles to the inclined face of the binder-table B, and is stepped at its lower end in a suitable bearing on the latter, and at its upper end has a bearing in an angular bracket $C^2$, secured to the longitudinal supporting-bar C′. To the upper end of said shaft is connected by a universal joint at $f^2$ a "tumbling" extension or shaft $F^2$, Figs. 6 and 7, extending upward beyond and in close proximity to the reel-shaft. The upper end of this shaft or extension $F^2$ slides in a pendent tubular bearing G, provided with a horizontal sleeve G′ surrounding the reel-shaft, the extension $F^2$ being grooved or feathered to adapt it to receive and drive a bevel-pinion *g*, mounted in a receptacle or socket-piece $G^2$, formed upon or secured to the lower end of the tubular bearing G, Fig. 6.

The receptacle $G^2$ is open or cut away on its outer side to permit the teeth of the pinion *g* to project on that side and engage with a bevel-wheel *g′*, secured to the spokes of the reel or to the reel-shaft adjacent thereto. By this arrangement of mechanism the reel is adapted to be driven in any of the various positions to which it may be adjusted, as above described, and from the same shaft which actuates the butting-board or by a tumbling extension hereof.

The rear end of the main binder gear-shaft $e$ is provided with a sprocket-wheel H, Fig. 2, which serves through a chain $h$ to drive a similar chain H′, secured to the rear end of the inner roller of the platform-apron, and the latter wheel H′ is provided with a crank-wrist from which a rod $h'$ extends outward, connecting said wrist with the rear end of a centrally-pivoted longitudinal lever $H^2$, Fig. 1, which at its forward end is connected with and serves to reciprocate the knife-bar.

The chain $h$ and the pitman $h'$, the latter on its upper face or edge, are provided with teeth or pins $h^2$ $h^3$, which on the upward and inward throw of the pitman and the inward movement of the chain on its upper side serve to assist in moving the grain inward and up the inclined binder-table B when the straw is of sufficient length to cause the heads to project beyond the rear edge of the platform-apron and binder-table, as suggested above.

The hangers or brackets I, attached to the longitudinal supporting-bar C′, and in which the picker-shaft $i$ (described in Patent No. 290,459, above referred to) is mounted, have one or more curved bars extending inward over the inclined binder-table, and being slightly curved and provided with ratchet-shaped teeth on their lower faces, allow the grain to readily pass by in its movement upward on the inclined binder-table, but effectually prevent its return on the backward movement. The bar I′ at its inner free end rests by gravity upon the inclined binder-table, or upon the ascending grain thereon, and forms what I term a "gravity-stop."

A second bar or rod $I^2$, Fig. 2, somewhat similar in form to the gravity-stop I′, is pivoted at its inner end to a heel-extension $i^2$ of one of the picker-links connecting the heel of the pickers $i'$, Fig. 10, with a pivot on the longitudinal supporting-bar C′, the outer end of the rod $I^2$ overhanging the upper end of the inclined binder-table, and being held suspended somewhat above said table by a cord or pivoted link $i^3$ connecting it with the driver's seat or other suitable support. The rod or bar $I^2$ is vibrated in the direction of its length through its connections with the picker-link and serves to force the bundles, after they leave the binding device, up to the upper portion of the inclined binder-table and out upon the discharging-apron attachment thereto.

The driver's seat J is secured to a supporting-standard J′, attached to and upheld by the binder-gear standard, as described in Patent No. 290,459, above referred to, except that said seat-standard, instead of being secured to the upper bearing-sleeve only of said gear-standard, as therein described, extends transversely and obliquely underneath said sleeve, and has its lower end secured firmly to the longitudinal supporting-bar C′, and, being secured also to said sleeve, serves to materially stiffen the attachment of said bar C′ to the gear-standard.

Directly in front of the binder-gear standard A is a transverse bar K, extending across the longitudinal plane of the driving-wheel and binding mechanism in advance of said parts, said bar forming a driver's foot-board. It rests upon the forward end of the longitudinal supporting-bar C′, and is secured to the binder-gear standard A by angular or curved brackets $k$ $k'$, Fig. 12, which serve to uphold it in the position described and shown. An additional support $k^2$ is shown at its outer end in the form of an upwardly and outwardly inclined rod or bar provided with angular projections at its sides, bolted the lower one to the outer end of the forward transverse frame-bar and the upper one to said foot-board K. The end of the foot-board overhangs the shoe at the inner end of the cutting apparatus, and is connected with said shoe by a grain-deflecting board $k^3$, extending forward and downward to the point of said shoe, as shown.

A standard L, attached to the outer end of the foot-board K, extends upward and backward, and is connected at its upper end with the seat-support J′, serving to steady the latter. This rod or standard is bent or provided with a coil $l$ at or near the center of its length to form an eye or bearing for an inclined shaft $m$, or a bearing-bracket may be attached to the standard L for that purpose, thereby avoiding the bending of the rod to form such bearing, though the latter construction is preferred. The shaft $m$ is provided on its upper end with a hand-wheel M or a crank-arm for operating it, and upon its lower end with a worm or screw $m'$, engaging with a worm-wheel $m^2$ on a longitudinal shaft $m^3$, from which chains or chain and rods extend to the main driving-wheel and grain-lever for adjusting the height of the main frame, platform, and cutting apparatus, as described in Patent No. 276,449, above referred to. (See Fig. 8.)

The foot-board K is also provided with a bearing for an upright shaft N, having on its lower end a screw-thread working in a nut $n$, having a shank swiveled in the tongue O in front of the pivoted connection of said tongue with the frame. The shaft N is provided on its upper end with a hand wheel or crank N′, which, like those for effecting the other adjustments of frame and reel above described, is within convenient reach of the driver in his seat, who by rotating said shaft can raise or depress the heel end of the tongue, and so rock the machine on its wheel for raising and depressing the cutters. (See Fig. 13.)

By the several arrangements of adjusting devices above described the height of the frame, its angle of inclination as well as that of the platform and cutters, and the position of the reel are all placed under control of the driver in his seat, and he is enabled to adapt the machine easily and quickly to the condition of the grain to be operated upon.

The short longitudinal shaft $e^3$, Fig. 7, above described, is provided in rear of the sprocket-wheel $e^2$ with a spur-wheel $e^4$, which engages with a similar wheel on the picker-shaft $i$, above referred to, for operating the same; or, if preferred, the main or first binder-shaft $e$ above described may be provided with a second sprocket-wheel in close proximity with the wheel $e'$, and a chain extending thence around a sprocket-wheel on the picker-shaft $i$ may be employed for driving the latter. Under either arrangement it will be seen from the foregoing description that the sickle-bar, the butting device, the pickers, and the reel are all connected with and driven from the same binder-shaft $e$. The particular form and arrangement of the pickers are described in Patent No. 290,459, above referred to.

Parts of the machine not herein particularly described will be constructed and arranged as described in said patents, Nos. 276,449 and 290,459, so far as they relate thereto, otherwise in any usual or preferred manner.

The combination and organization of many of the parts herein set forth are not claimed herein, as they constitute the subject-matter of another division hereof, Serial No. 128,759, filed simultaneously herewith and patented.

I do not of course broadly claim a binder-gear standard having rearwardly-extending arms, as such a device is shown in prior patents of my own and of others.

Having thus fully described the organization and operation of my improved grain-binding harvester, what I claim herein as new and of my own invention, and desire to secure by Letters Patent, is—

1. The combination, substantially as hereinbefore set forth, of the longitudinal supporting-bar C′, the binder-gear standard, and the driver's-seat standard J′, secured to the supporting-bar and to the upper arm or sleeve of the binder-gear standard.

2. The combination, substantially as hereinbefore set forth, of the frame, the tongue hinged thereto, the driving-wheel, the platform-apron, the inclined binder-table interposed between the wheel and platform, the binder-gear standard on the grain side of the driving-wheel in advance of the path of the grain, a cross-bar K, connected with and upheld by the binder-gear standard, and mechanism, substantially such as described, mounted thereon to rock or tilt the machine.

3. The combination, substantially as hereinbefore set forth, of the binder-gear standard located on the grain side of the driving-wheel in advance of the path of the grain in being elevated over said wheel, and a driver's foot-board connected with and upheld by said gear-standard, and supporting a shaft actuating a pivoted tongue for rocking the machine on the driving-wheel.

4. In a self-binding harvester, the combination, with the platform-frame, of a binder-gear standard located on the grain side of the driving-wheel forward of the path of the moving grain, binder mechanism supported by said standard, and a driver's foot-rest forward of said gear-standard.

5. The inclined binder-table on the grain side of the driving-wheel, in combination with a binder-gear standard located in advance of the path of the grain over said table, and a reel-standard mounted on a supporting-bar supported by said gear-standard.

6. In a self-binding grain-harvester having a side-delivery grain-platform, the combination of an inclined elevating-table and binding mechanism suitably arranged for the binding of the grain inside of the path of the driving-wheel, the longitudinal main binder-shaft $e$, and the cross-shaft actuating the latter, arranged beneath the binder-table and acting on said main shaft on the platform side of the driving-wheel.

7. The combination, substantially as hereinbefore set forth, of the frame, the driving-wheel on the outer or stubble side thereof, the platform-apron, the inclined elevating binder-table, the binder-gear standard between the driving-wheel and platform-apron in advance of the path of the grain, arms on said standard projecting rearwardly, binding mechanism carried by said arms, and a driver's seat interposed between the vertical plane of the driving-wheel and the binder-gear standard, and secured to the latter, for the purpose described.

8. The combination, substantially as hereinbefore set forth, of the frame, the driving-wheel on the outer or stubble side thereof, the platform-apron, the inclined elevating binder-table, the binder-gear standard between the driving-wheel and the platform-apron in advance of the path of the grain, arms on said standard projecting rearwardly, binding mechanism carried by said arms, and a driver's foot-board secured to the front of the binder-gear standard, for the purpose described.

9. The combination, substantially as hereinbefore set forth, of the frame, the driving-wheel on the outer or stubble side thereof, the platform-apron, the inclined elevating binder-table, the binder-gear standard between the driving-wheel and platform-apron in advance of the path of the grain, arms on said standard projecting rearwardly, the binding mechanism carried by said arms, a driver's seat supported on said standard, and a driver's foot-board secured to the binder-gear standard, for the purpose described.

10. The combination, substantially as hereinbefore set forth, of the frame, the driving-wheel on the outer or stubble side thereof, the platform-apron, the inclined elevating binder-table, the binder-gear standard between the driving-wheel and the platform-apron in advance of the path of the grain, arms on said standard projecting rearwardly, binding mechanism carried by said arms, a longitudinal supporting-bar interposed between the platform-apron and binder-gear standard, a driver's-seat-supporting standard secured to said bar and to the binder-gear standard, and a driver's foot-board secured to the binder-gear standard and the longitudinal supporting-bar, for the purpose described.

11. The combination, substantially as hereinbefore set forth, of the frame, the driving-wheel on the outer or stubble side thereof, the platform-apron, the inclined elevating binder-table, the binder-gear standard between the driving-wheel and platform-apron in advance of the path of the grain, arms on said standard projecting rearwardly, binding mechanism carried by said arms, a longitudinal supporting-bar interposed between the platform-apron and binder-gear standard, a driver's foot-board secured to the binder-gear standard and longitudinal supporting-bar, and a reel-support mounted on said supporting-bar, for the purpose described.

12. The combination, substantially as hereinbefore set forth, of the frame, the driving-wheel on the outer or stubble side thereof, the platform-apron, the inclined elevating binder-table, the binder-gear standard between the driving-wheel and platform-apron in advance of the path of the grain, arms on said standard projecting rearwardly, binding mechanism carried by said arms, a longitudinal supporting-bar interposed between the platform-apron and binder-gear standard, a driver's foot-board secured to the binder-gear standard and a supporting-bar, a reel mounted on said supporting-bar, and reel-driving mechanism also carried by the foot-board and supporting-bar, for the purpose described.

13. The combination, substantially as hereinbefore set forth, of the frame, the driving-wheel on the outer or stubble side thereof, the platform-apron, the inclined elevating binder-table interposed between the driving-wheel and platform-apron, the binder-gear standard between the driving-wheel and platform-apron in advance of the path of the grain, arms on said standard projecting rearwardly, the longitudinal main binder or driving shaft *e*, its actuating cross-shaft, and binding mechanism carried by said arms, for the purpose described.

In testimony whereof I have hereunto set my hand this 11th day of April, A. D. 1884.

LEWIS MILLER.

Witnesses:
O. L. SADLER,
L. H. HANSCOM.